(12) United States Patent
Hüther

(10) Patent No.: US 7,401,866 B2
(45) Date of Patent: Jul. 22, 2008

(54) BRAKING DEVICE FOR AN INDUSTRIAL TRUCK

(75) Inventor: Sebastian Hüther, Hamburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 711 days.

(21) Appl. No.: 10/753,975

(22) Filed: Jan. 8, 2004

(65) Prior Publication Data
US 2004/0164610 A1   Aug. 26, 2004

(30) Foreign Application Priority Data
Jan. 8, 2003   (DE)  ................................ 103 00 199

(51) Int. Cl.
*B60T 13/66* (2006.01)
(52) U.S. Cl. ................ 303/20; 303/15; 303/3; 188/156; 188/DIG. 1
(58) Field of Classification Search ............. 303/20, 303/15, 3, 115.2, 113.4; 188/DIG. 1, 156, 188/161; 310/77; 335/281
See application file for complete search history.

(56) References Cited

U.S. PATENT DOCUMENTS

| | | | | |
|---|---|---|---|---|
| 4,327,414 A | * | 4/1982 | Klein | ................ 701/79 |
| 4,602,702 A | * | 7/1986 | Ohta et al. | ........... 188/72.1 |
| 5,333,706 A | * | 8/1994 | Mori | ................ 188/156 |
| 5,439,275 A | * | 8/1995 | Padula et al. | .......... 303/3 |
| 5,646,848 A | * | 7/1997 | Walenty et al. | ......... 701/70 |
| 5,653,515 A | * | 8/1997 | Takeda et al. | ........ 303/138 |
| 6,249,737 B1 | * | 6/2001 | Zipp | ................ 701/70 |
| 6,542,793 B2 | * | 4/2003 | Kojima et al. | .......... 701/1 |
| 6,572,200 B2 | * | 6/2003 | Soga et al. | ............ 303/3 |
| 6,698,555 B2 | * | 3/2004 | Schafer et al. | ........ 188/170 |
| 6,709,069 B2 | * | 3/2004 | Riddiford et al. | ....... 303/20 |

FOREIGN PATENT DOCUMENTS

JP   2002-255498 A   *   9/2002

* cited by examiner

Primary Examiner—Robert A. Siconolfi
Assistant Examiner—Mariano Sy
(74) Attorney, Agent, or Firm—Vidas, Arrett & Steinkraus, P.A.

(57) ABSTRACT

A braking device for an industrial truck, comprising an electromagnetic brake unit on a load-bearing wheel and/or driving motor, a brake pedal the position of which is detected by an electric position detector which generates an analog electric braking signal, and a brake control into which the analog braking signal in input and which generates a control signal to actuate the brake unit electromagnetically in response to the analog braking signal, characterized in that the area of the end position of the brake pedal has associated therewith a signal transmitter connected to the brake control which provides a first signal to the brake control when the brake pedal is within the range of response of the signal transmitter and the brake control generates a control signal for the brake unit that causes a hard stop.

5 Claims, 2 Drawing Sheets

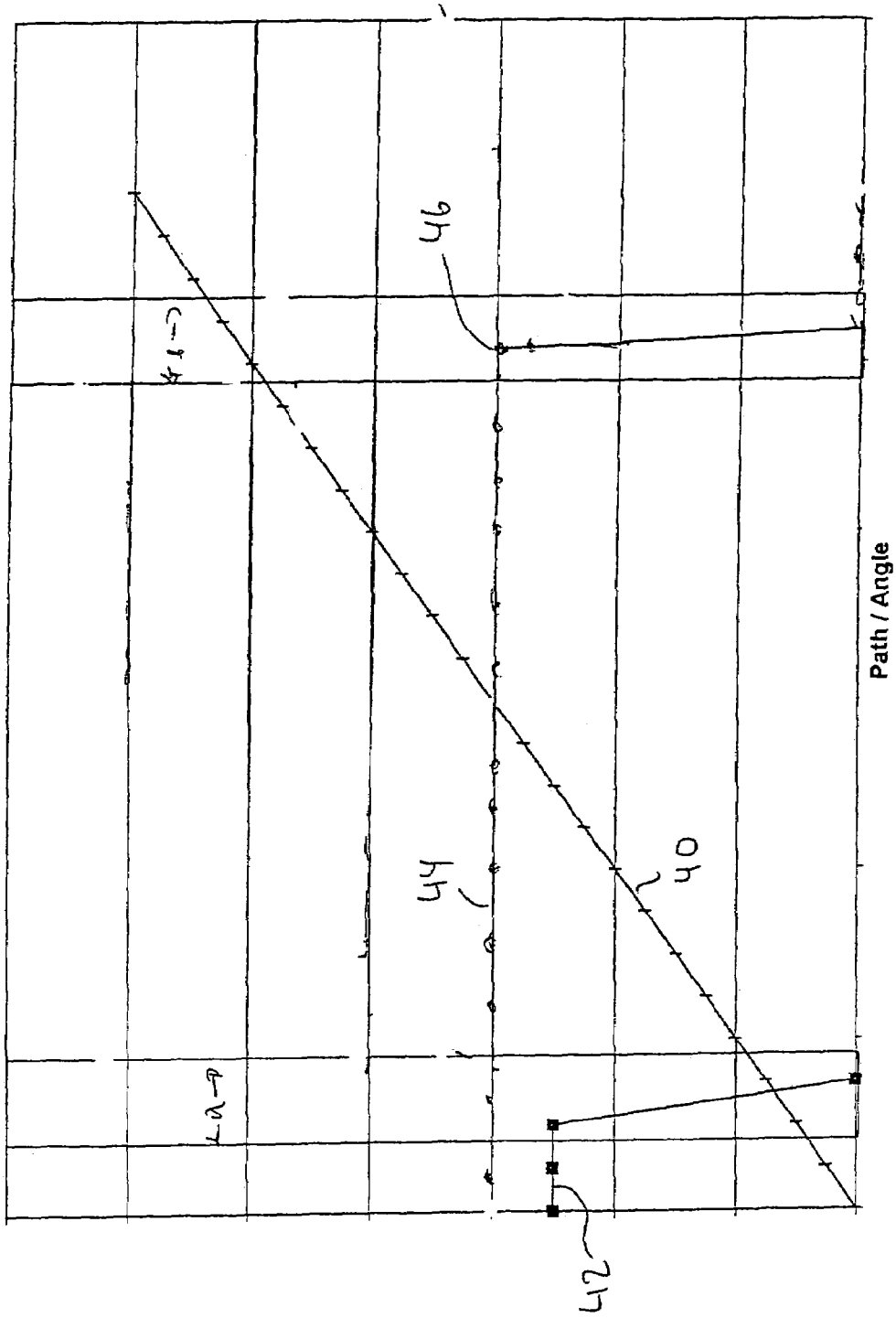

BRAKING DEVICE FOR AN INDUSTRIAL TRUCK

CROSS-REFERENCE TO RELATED APPLICATIONS

Not applicable.

STATEMENT REGARDING FEDERALLY SPONSORED RESEARCH

Not applicable.

BACKGROUND OF THE INVENTION

A large number of industrial trucks are powered by a battery. This makes it possible to obtain a braking effect by operating the electric motor as a generator. However, this generally is insufficient. Therefore, it is known to arrange a brake, i.e. a brake disc or brake drum, on the shaft of the motor. It is common to configure such brakes as spring brakes in which an electromagnetic force is applied to keep the braking member out of engagement with the brake disc or brake drum and the spring performs the braking procedure when such electric activation is stopped. It is further known to support the actuation of the spring electromagnetically.

As an alternative or in addition, it is further known to provide one load-bearing wheel of the industrial truck with a brake. The brake can be actuated hydraulically as has been generally known for other vehicles for a long time. However, it is also imaginable to actuate the brake unit electromagnetically on a load-bearing wheel.

Efforts have been made for some time to actuate electromagnetic brake systems electrically. Therefore, the connection between a brake pedal and the brake unit, e.g. on the load-bearing wheel, is effected in an electric way. The brake pedal has associated therewith a potentiometer or comparable electric position detector which generates an electric braking signal, which is provided to a brake control, in dependence on the actuation path of the brake signal. The brake control, in turn, generates an control signal for actuating the brake unit in response to the braking signal.

If the operation of the position detector fails for certain reasons a braking procedure naturally will not come about when the brake pedal is actuated. Nevertheless, for safety reasons, it has to be ensured that the driver brings the industrial truck to a fast stop. When the electric supply breaks down, e.g. because of cable rupture or the like, care can be taken in the form of an emergency current supply that there is still sufficient energy at least for the braking procedure to be initiated. However, this cannot compensate for the breakdown of a position detector.

It is the object of the invention to provide a braking device for an industrial truck including an electric braking unit in which a braking procedure can be carried out even if the position detector breaks down.

BRIEF SUMMARY OF THE INVENTION

In the invention, the area of the end position of the brake pedal has associated therewith a signal transmitter connected to the brake control. It provides a first signal to the brake control when the brake pedal is within the range of response of the signal transmitter. As a result, the brake control provides an actuating signal to the brake unit that causes a hard stop.

The driver of an industrial truck who wishes to initiate a braking procedure and finds out that no relevant reaction of the brake occurs upon actuation of the brake pedal will completely floor the braking pedal by instinct, hoping to achieve a braking effect after all. This is all the more so when circumstances require to brake the vehicle instantaneously. The invention activates the signal transmitter associated with the brake pedal. It generates an appropriate signal for the brake control which will then launch a hard stop action. Therefore, the inventive device makes it possible to ensure that the vehicle even be efficiently braked even if there is a complete failure of the position detector by which the braking procedure may be controlled more or less delicately.

According to another aspect of the invention, it further is advantageous for vehicle safety to associate a second signal transmitter with the brake pedal so as to provide a second signal to the brake control when the brake pedal has traveled through a first short actuation path from its rest position and the brake control generates a release signal for the generation of the control signal in response to the braking signal. This tests the braking device, so to say. When the driver lightly taps the brake pedal the brake control can readily find out whether the position detector is generating a braking signal as prescribed. If this is not the case there is a malfunction of the braking device, but the driver can make a hard stop, according to the invention. Therefore, he will satisfy himself of the functionality of the braking device in the manner described before he starts his travel. Likewise, it is possible to generate an alarm signal when the braking signal is not of the predetermined magnitude upon response of the second signal transmitter.

Different components can be used as signal transmitters. For instance, microswitches can be provided which are associated with the brake pedal. Alternatively, known proximity switches, particularly Hall sensors, may be employed which cope with the harsh operation of industrial trucks. Preferably, such signal transmitters generate a digital signal which is then provided directly to the brake control and can be processed there.

BRIEF DESCRIPTION OF THE DRAWINGS

The invention will be described in more detail below with reference to the drawings.

FIG. 2 shows a graph of the individual signals which are generated in the braking device according to the invention.

DETAILED DESCRIPTION OF THE INVENTION

Figure 1:
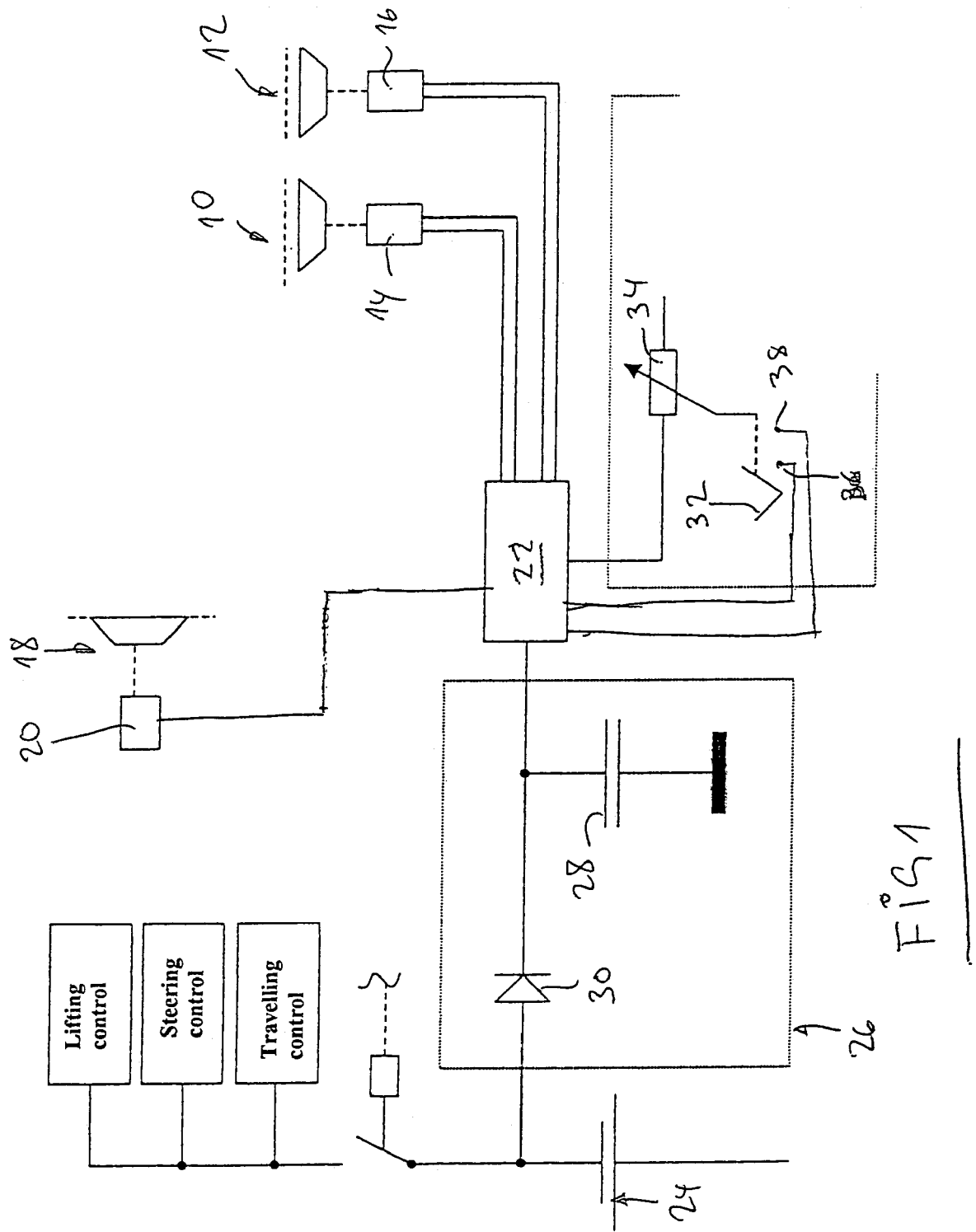
FIG. 1 shows a diagram of a braking device according to the invention.

While this invention may be embodied in many different forms, there are described in detail herein a specific preferred embodiment of the invention. This description is an exemplification of the principles of the invention and is not intended to limit the invention to the particular embodiment illustrated In FIG. 1, two load-bearing wheel brakes 10, 12 are outlined for an industrial truck which is not shown. They are actuated or controlled electromagnetically by the electromagnets 14 and 16. Further, a so-called drive brake 18 is shown which is associated with the driving motor, for example. It is also actuated by means of an electromagnet 20. The brakes are triggered via a brake control 22 which controls the supply of electric energy to the brakes 10, 12, and 18 from a vehicle battery 24. Furthermore, the industrial truck which is not shown has control components for the lifting control, steering control, and travelling control. No reference will be made thereto here. However, the drive brake 18 can be actuated via the steering and travelling controls or a brake actuation can be effected in dependence on parameters from these control components. A connection between the steering and travelling controls and the brake control 22 is not illustrated in FIG. 1.

An emergency current supply 26 is connected between the battery 24 and the brake control and includes a capacitor 28 and a diode 30. The emergency current supply 26 is capable of continuing to provide the brake control with energy for a predetermined time to carry out a braking procedure.

A brake pedal 32 which interacts with a potentiometer 34 as a position detector is provided to actuate the above mentioned brakes. In this way, an analog signal which is in the form of an analog voltage is generated for the brake control in response to which the brakes 10, 12, and 18 are actuated. Associated with the brake pedal 32 are two signal transmitters 36, 38. The signal transmitter 36 is in a position enabling it to respond from a rest position via a small path when the brake pedal 32 is actuated. Its signal is transmitted to the brake control 22. The other signal transmitter 38 is arranged so as to generate a signal when the brake pedal is floored more or less completely up to the end. This signal is also transmitted to the brake control 22.

In FIG. 2, the straight line 40 represents the braking signal which is provided to the brake control 22 from the potentiometer 34. The braking signal 40 rises linearly in dependence on the path or angle of the brake pedal 32. The signal transmitters 36, 38 can be configured as switches or normally closed contacts. This means that a current flows through the contacts when they are closed. In FIG. 2, the closed-circuit current for the signal transmitter 36 is plotted at 42. The current will drop to zero when the contact is opened by stepping on the pedal. This digital signal is transmitted to the brake control 22 and the latter determines whether the braking signal 40 is there or has a predetermined magnitude at this time. If this is the case it may be presumed that signal generation functions properly via the brake pedal 34.

The closed-circuit current which flows through the second normally closed current contact 38 is outlined at 44. The contact 38 opens when the brake pedal 32 has reached its end position or is close to it. The end position is outlined by the point 46. The current drops to zero and the digital signal undergoes appropriate processing in the brake control 22 as an control signal is now provided to the brakes 10, 12 and possibly 18 and will cause a hard stop. This signal is also generated when the potentiometer 34 fails for any reason and a braking signal 40 does not come off.

The areas marked by a and b in FIG. 2 represent the tolerance range for the first and second signals. It is understood that if switches or even proximity sensors or the like are used the output signal is not generated at exactly the same length of travel of the brake pedal.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A braking device for an industrial truck, comprising an electromagnetic brake unit on a load-bearing wheel and/or driving motor, a brake pedal having a rest and an end position and positions between the rest and the end position, the positions of the pedal being detected by an electric position detector which generates an analog electric braking signal, and a brake control unit into which the analog braking signal is input and which generates a control signal to actuate the brake unit electromagnetically in response to the analog braking signal, a first signal transmitter being provided associated with the end position of the brake pedal, connected to the brake control unit and having a range of response, which transmitter provides a first signal to the brake control unit when the brake pedal is within the range of response of the first signal transmitter so that the brake control unit generates a first control signal for the brake unit causing a hard stop independent of whether an analog electric braking signal has been generated, the brake pedal being associated with a second signal transmitter in a way that it provides a second signal to the brake control unit when the brake pedal has traveled through a first short actuation path from the rest position, the brake control unit generating a release signal for allowing the generation of a second control signal for the brake unit when the position detector has generated the analog braking signal at the same time, and the brake control unit generating an alarm signal when the braking signal is not of a predetermined magnitude upon generation of the second signal.

2. The device as claimed in claim 1, characterized in that the first and/or second signal transmitter(s) (38, 36) produce a digital signal.

3. The device as claimed in claim 1, characterized in that at least one signal transmitter (36, 38) is a mechanical switch.

4. The device as claimed in claim 1, characterized in that at least one signal transmitter (36, 38) is a proximity sensor.

5. The device as claimed in claim 4, characterized in that the proximity sensor is constituted by a Hall sensor.

\* \* \* \* \*